Nov. 19, 1935.　　　W. N. SMITH　　　2,021,155
TIRE INFLATING DEVICE
Filed Aug. 19, 1932　　　2 Sheets-Sheet 1
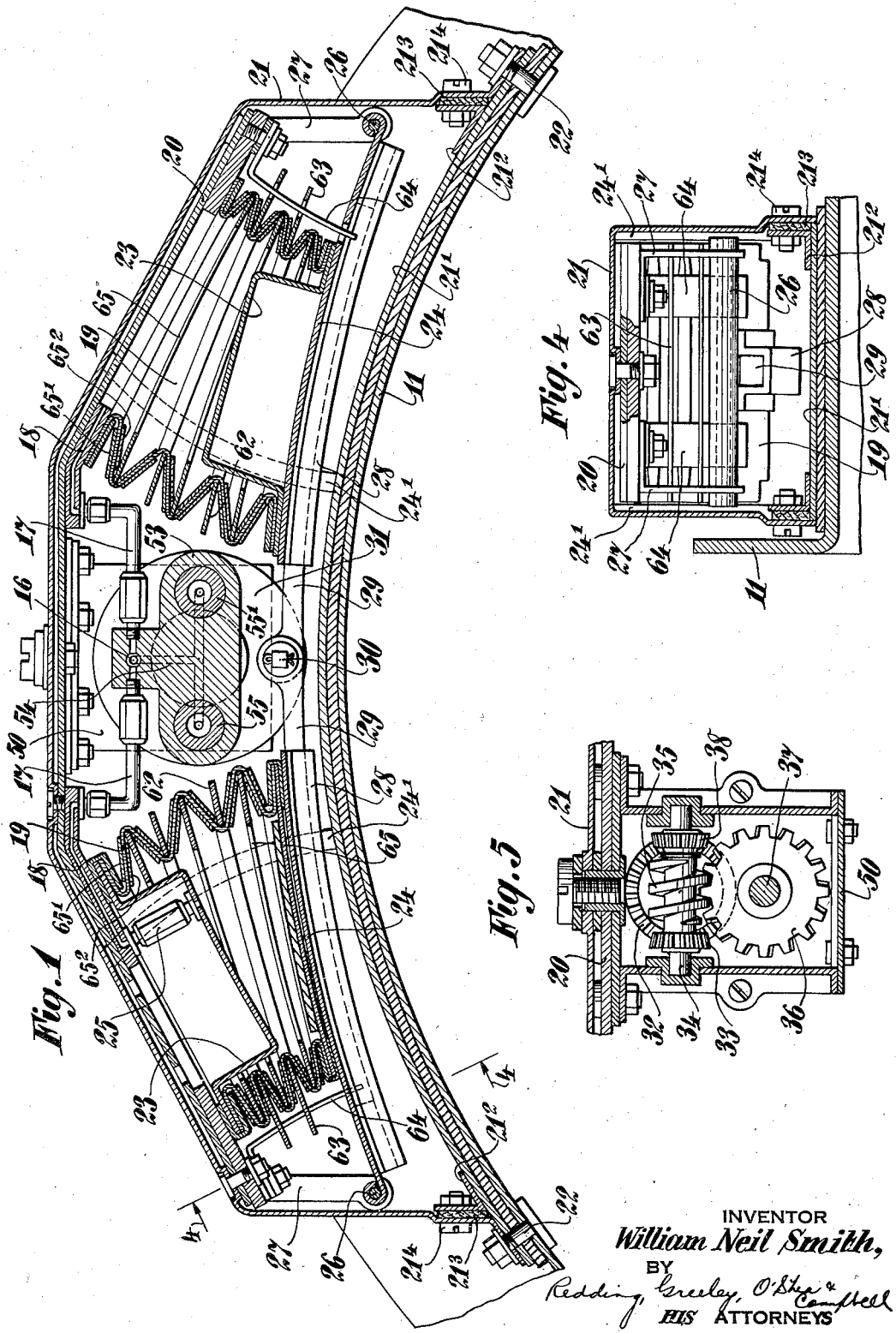
INVENTOR
William Neil Smith,
BY
Redding, Greeley, O'Shea & Campbell
HIS ATTORNEYS Nov. 19, 1935.    W. N. SMITH    2,021,155
TIRE INFLATING DEVICE
Filed Aug. 19, 1932    2 Sheets-Sheet 2
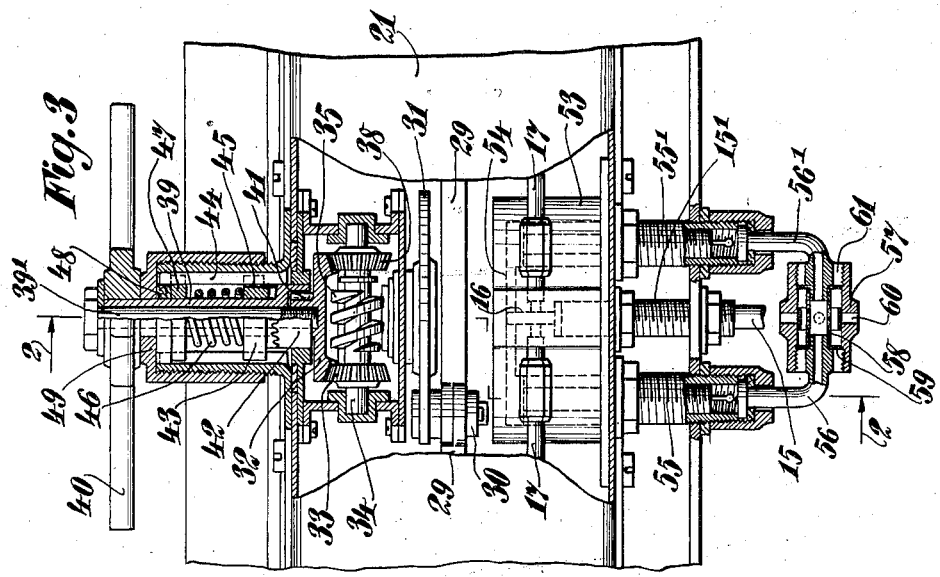
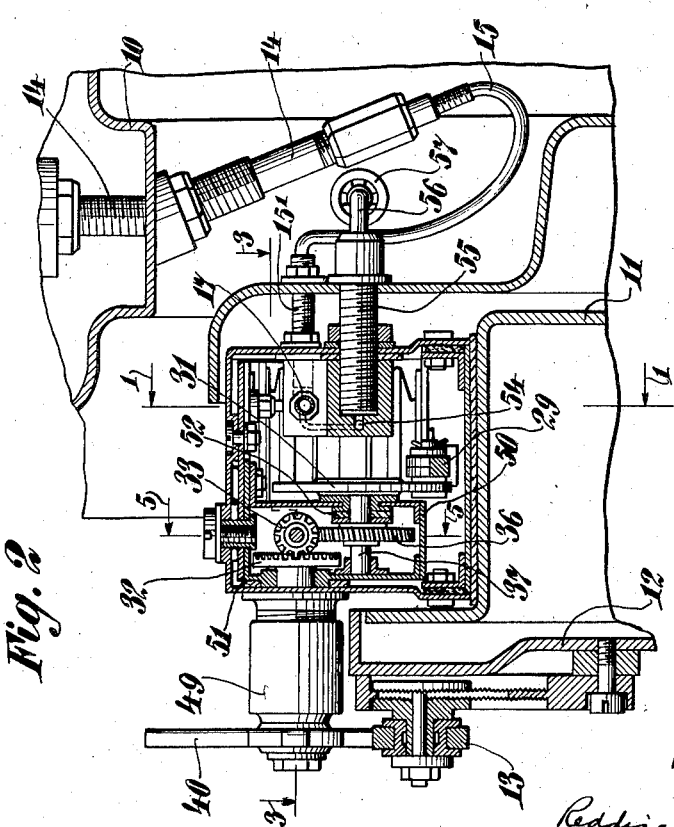
INVENTOR
William Neil Smith,
BY
Redding, Greeley, O'Shea & Campbell
HIS ATTORNEYS Patented Nov. 19, 1935

2,021,155

UNITED STATES PATENT OFFICE 2,021,155

TIRE INFLATING DEVICE

William Neil Smith, New York, N. Y.

Application August 19, 1932, Serial No. 629,489

3 Claims. (Cl. 152—11)

The present invention relates to devices for inflating automobile tires and the like and embodies, more specifically, an improved tire inflating mechanism which is adapted to be actuated automatically by motion of the vehicle. The present invention constitutes an improvement over the form of the invention shown and described in applicant's co-pending application Serial No. 610,539 filed May 11, 1932 for Automatic tire inflating device, and provides an effective mechanism for inflating vehicle tires during the rotation thereof, the mechanism being so constructed as to cause both the centrifugal force produced during rotation of the vehicle wheel, and the air pressure produced within the air tight and weatherproof housing of the device, through the movement of the bellows, to assist in the inflating operation.

An object of the invention, accordingly, is to provide an improved and simplified mechanism for inflating tires automatically upon rotation thereof.

A further object of the invention is to provide a mechanism for the operation of an inflating device, the mechanism being so constructed as to allow the device to operate with the vehicle wheels moving either in forward or backward direction, without damage, and to provide for the use of the same device at all wheels (right and left hand side) of the vehicle without change in the construction of the mechanism and also to provide slow operation of the bellows, and the maximum power necessary for the compression of the air in the bellows with a minimum of pressure at the power source.

Further objects, not specifically enumerated above, will be apparent as the invention is described in greater detail in connection with the accompanying drawings, wherein:

Figure 1 is a view in section, taken on line 1—1 of Figure 2, and looking in the direction of the arrows.

Figure 2 is a view in section, taken on the broken line 2—2 of Figure 3, and looking in the direction of the arrows.

Figure 3 is a view in section taken on line 3—3 of Figure 2, and looking in the direction of the arrows.

Figure 4 is a view in section, taken on line 4—4 of Figure 1, and looking in the direction of the arrows.

Figure 5 is a view in section, taken on line 5—5 of Figure 2, and looking in the direction of the arrows.

Referring to the above drawings, a vehicle wheel is shown at 10 which has mounted thereon the usual brake drum 11 of usual construction. The usual relatively stationary dust cover 12 is shown, upon which an adjustable strike 13 is mounted. This structure is in accordance with the structure shown in applicant's co-pending application above noted and need not be described in further detail herein. An air tight housing 21 and 21' which encloses the mechanism of the inflating device is shown mounted upon the brake drum 11. The valve stem of a tire is illustrated at 14 and is connected to an air conduit 15 which receives air from pumping mechanism shown in detail in Figure 1.

With reference to Figure 1, the fitting to which air conduit 15 is connected through $15^1$ is illustrated at 16 and communicates, through oppositely extending air pipes 17, with air ducts 18 which communicate with the interior of collapsible bellows 19. These bellows are mounted upon plates 20 which are suitably fastened to the air tight housing 21 which, in turn, is secured to the bottom plate of the housing $21^1$ by bolts $21^4$ through bolting angle $21^2$, the connection being made air tight by basket $21^3$, the entire housing being secured to the brake drum 11 by means of bolts 22.

Air displacement cones 23 are mounted within each bellows, the left hand bellows of Figure 1 illustrating one form of the invention wherein the displacement cone is mounted directly upon the plate 20 while the right hand bellows of Figure 1 illustrates the displacement cone as being mounted upon a pivoted plate 24. In the event that the displacement cones are mounted upon plate 20, a fitting 25 is provided to afford communication between ducts 18 and the interior of the bellows.

In order that the bellows may be expanded for the filling of the bellows with outside air and collapsed to produce air under pressure effectively, plates 24 are secured thereto which slide between guide tracks $24^1$ secured to housing 21, the plates 24 being pivoted at 26 upon arms 27 which are secured to plate 20. Elongated recesses formed by channels 28 are provided on the backs of plates 24 and a rod 29 is received in these recesses and journaled at 30 upon a rotatable disk 31. It will thus be seen that, as disk 31 is rotated, the rod 29 will cause the collapsing and expanding of the bellows 19.

Rotation of disk 31 is effected by means of a driving gear 32 which engages a driven pinion 33 upon the shaft 34 of which a worm 35 is formed. Worm 35 engages a worm wheel 36 upon a shaft 37 to which disk 31 is secured. An idler pinion 38 is provided to equalize the thrust upon gear 32, the idler pinion being journaled upon shaft 34.

Gear 32 is driven by means of a shaft 39 which is hollowed out to receive connection bolt $39^1$, the shaft 39 together with connection bolt $39^1$ being actuated by arms 40 which are adapted to engage the strike 13. Shaft 39 drives gear 32 through a suitable detachable connection 41, the detachable connection 41 being held to shaft 39 by a screw end on connection bolt $39^1$, and the motion of gear 32 is of step by step character which is maintained when fast rotation of the arms 40 occurs, when the vehicle wheels revolve at high speeds, by reason of the provision of a spring pressed clutch construction including a clutch member 42, formed upon the shaft 39, and a clutch member 43 which is slidable axially of shaft 39 but is prevented from rotation with respect thereto by means of ribs 44 which engage recesses 45 in the member 43. A spring 46 normally urges the member 43 against the member 42 and is seated against a slidable non-revolving disk 47 which engages a sealing member 48 and thus effectively seals the bearing of shaft 39 in the housing 49.

In order that the driving mechanism may be effectively lubricated, the gears and shafts are enclosed within a fluid tight housing 50, sealing disks 51 and 52 being provided at the points where shafts enter or leave the housing.

Air conduits 17 communicate with a fitting 53 which is formed with a T-shaped duct 54, the ends of which communicate with air conduit 15 and air inlet valve 55 and safety air escape (blow off) valve $55^1$. This enables outside air to be drawn into the bellows through air inlet valve 55, excess air pressure to escape through safety air escape valve $55^1$ and air to flow to the tire through conduit 15. Valves 55 and $55^1$ are connected to pipes 56 and $56^1$ which are secured to an apertured sleeve 57 by means of which outside air may be drawn into the pipe 56 and air may escape to outer air through pipe $56^1$. A cylindrical screen member 58 is provided with turned back ends 59 and radial and axial ducts 60 and 61, respectively, are formed in the member 57 through which air may pass. The construction of air inlet valve 55 and safety air escape valve $55^1$ is in accordance with the construction shown in applicant's co-pending application referred to hereinabove.

Anti-distortion rings 62 are provided in the bends of the bellows and formed with extensions 63 through which guides 64 extend. The motion of the bellows is thus effectively controlled and collapse thereof prevented by means of rings 65 therein. At left hand bellows of Figure 1 stiffener or reinforcing plates $65^1$ and $65^2$ are shown at the folds of the bellows to provide greater strength at bellows which contain high air pressures.

From the foregoing, it will be apparent that an inflating device has been provided for vehicle tires, the device functioning effectively to automatically pump compressed air, through a discharge tube, into a pneumatic tire, in sufficient quantity, and at a regulated pressure sufficient to maintain the proper required air pressure at the tire, but so as not to allow an excess in quantity or pressure of air to enter the tire. The number of driving parts is few and their construction such that the device may function with a minimum of moving parts, requiring infrequent lubrication, such parts being enclosed in an air tight housing for protection from damage and the elements, and the construction of the mechanism being such as to utilize both the centrifugal force generated during the rotation of the device and the air pressure generated by the action of the bellows within the air tight housing to assist the pumping action of the bellows. The construction of the entire device is such that the weights of all mechanism housing etc. are so distributed as to attain perfect balance.

While the invention has been described with specific reference to the device shown in the accompanying drawings, it is not to be limited, save as defined in the appended claims.

I claim as my invention:

1. An inflating device for a vehicle tire comprising a pumping mechanism, means to mount the mechanism upon a vehicle wheel, a rotatable member, means operated by rotation of the wheel to rotate the member, means operated by the member to actuate the pumping mechanism, a housing, a cover for the housing, an operating shaft journaled in the cover, a sealing washer within the cover, a clutch to maintain the shaft in predetermined positions, and a spring between the clutch and washer.

2. An inflating device for a vehicle tire comprising a pumping mechanism, means to mount the mechanism upon a vehicle wheel, a rotatable member, means operated by rotation of the wheel to rotate the member, means operated by the member to actuate the pumping mechanism, an operating shaft for transmitting forces between the rotatable member and the means to rotate the same, and a yielding clutch to maintain the shaft in predetermined positions.

3. An inflating device for a vehicle tire comprising a pumping mechanism, means to mount the mechanism upon a vehicle wheel, a rotatable member, means operated by rotation of the wheel to rotate the member, means operated by the member to actuate the pumping mechanism, and a yielding clutch to maintain the member in predetermined positions.

WILLIAM NEIL SMITH.